United States Patent [19]
Oshita

[11] Patent Number: 5,343,306
[45] Date of Patent: Aug. 30, 1994

[54] FACSIMILE MACHINE USING CUT SHEETS OF PAPER OF MULTIPLE SIZES

[75] Inventor: Fumiyo Oshita, Amagasaki, Japan

[73] Assignee: Mitsubishi Denki Kabushiki Kaisha, Tokyo, Japan

[21] Appl. No.: 818,270

[22] Filed: Jan. 8, 1992

[30] Foreign Application Priority Data

Jan. 14, 1991 [JP] Japan .................................. 3-16079

[51] Int. Cl.⁵ .............................................. H04N 1/21
[52] U.S. Cl. .................................... 358/441; 358/449
[58] Field of Search ............... 358/451, 297, 296, 468, 358/449, 434, 437, 441

[56] References Cited

U.S. PATENT DOCUMENTS

| 4,353,097 | 10/1982 | Takeda et al. | 358/287 |
|---|---|---|---|
| 4,506,302 | 3/1985 | Kurata | 358/285 |
| 4,695,898 | 9/1987 | Ishikawa et al. | 358/296 |
| 4,731,658 | 3/1988 | Koseki | 358/287 |
| 4,933,771 | 6/1990 | Matsuura et al. | 358/296 |
| 5,150,224 | 9/1992 | Mizude et al. | 358/449 |

FOREIGN PATENT DOCUMENTS

| 391632 | 10/1990 | European Pat. Off. . |
|---|---|---|
| 2365217 | 6/1978 | Fed. Rep. of Germany . |
| 3523819 | 1/1986 | Fed. Rep. of Germany . |
| 200668 | 8/1988 | Japan . |
| 2101443 | 1/1983 | United Kingdom . |
| 2176967 | 1/1987 | United Kingdom . |

Primary Examiner—Stephen Brinich
Attorney, Agent, or Firm—Rothwell, Figg, Ernst & Kurz

[57] ABSTRACT

In a facsimile machine printing received image data on cut sheets that are loaded, cut sheets of different sizes being selectively and exchangeably loaded, a page length determining means, such as a scan line counter, determines the length of each page of the document of which the image data is received. In the event that the document of which the image data is received contains a page which is longer than the cut sheet being loaded, the image data for that page and any subsequent pages is stored in an image memory, and an alarm is actuated to indicate to the operator the occurrence of a longer page, thereby prompting replacement of the cut sheets with those of a longer size.

12 Claims, 4 Drawing Sheets

1ST PAGE     2ND PAGE     3RD PAGE

LETTER-SIZE    LEGAL-SIZE    LETTER-SIZE

1ST PAGE     2ND PAGE     3RD PAGE

LETTER-SIZE    LEGAL-SIZE    LEGAL-SIZE

1ST PAGE   2ND PAGE   3RD PAGE

LETTER-SIZE   LEGAL-SIZE   LETTER-SIZE

1ST PAGE   2ND PAGE   4TH PAGE

LETTER-SIZE   LETTER-SIZE   LETTER-SIZE

3RD PAGE

LETTER-SIZE

FACSIMILE MACHINE USING CUT SHEETS OF PAPER OF MULTIPLE SIZES

BACKGROUND OF THE INVENTION

1. Field of the Invention

The present invention concerns a facsimile machine for printing received image data on cut sheets of paper.

2. Prior Art

A facsimile machine is used to transmit image data representing a document comprising one or more pages, to another facsimile machine over a communication line, such as a telephone line, or to receive image data from another facsimile machine and print the image. In facsimile machines which have been in widespread use, printing is made on paper unwound from a paper roll, and the paper is thereafter cut into sheets with lengths corresponding to the lengths of the respective pages of the received document. In another type of facsimile machine which is becoming popular, use is made of a paper cassette containing cut sheets, which are extracted one by one, and the image is printed on the cut sheets.

A prior-art facsimile machines of the latter type is typically provided with a paper cassette slot in which a paper cassette containing cut sheets of paper of different sizes, e.g., a letter size and a legal size, can be removably loaded. A plurality of paper cassettes may be provided and can be selectively loaded according to the size of the sheets of the document of which image data is transmitted from another facsimile machine.

When however the image data of a document page longer than the sheets which are currently loaded is received, part of the image data that has overflowed the first sheet is printed on the next sheet. That is, the image data that is in a single page in the original document is divided into two sheets. This is inconvenient, particularly where the image data contains a picture or a table.

SUMMARY OF THE INVENTION

An object of the present invention is to prevent the division of the image data for one document page into two sheets even when the length of the data for one document page exceeds the length of the sheets currently loaded.

A facsimile machine in accordance with the present invention is for printing image data received from another facsimile machine, on cut sheets that are loaded, cut sheets of different sizes capable of being selectively and exchangeably loaded, said image data being of one or more pages of a document, and being accompanied with page-end information indicating the end of each of said pages. The facsimile machine comprises:

a printing means for printing the image data on cut sheets being loaded, each cut sheet on which the image data of each page is printed being ejected at the end of each page as indicated by said page-end information, so that another cut sheet is fed to the printing means when the image data of the next page is present;

a page length determining means for determining the length of each page of the document of which the image data is received;

an image memory means;

an alarm means; and a control means which, in the event that image data for a document page which is longer than the cut sheet being loaded is received, will cause the data for that page and any subsequent pages to be stored in said image memory means, and actuate said alarm means;

said alarm means indicating the reception of a document page that is longer than the cut sheet being loaded and prompting replacement of the cut sheets with cut sheets of a longer size.

When image data of a document page that is longer than the sheet that is currently loaded is received, the image data for that page and any subsequent pages of the document is stored in the image data memory, and the alarm means is actuated to prompt the operator to substitute the cut sheets of the longer size.

DETAILED DESCRIPTION OF THE PREFERRED EMBODIMENTS

An embodiment of the invention will now be described with reference to FIG. 1 to FIG. 4.

Figure 1:
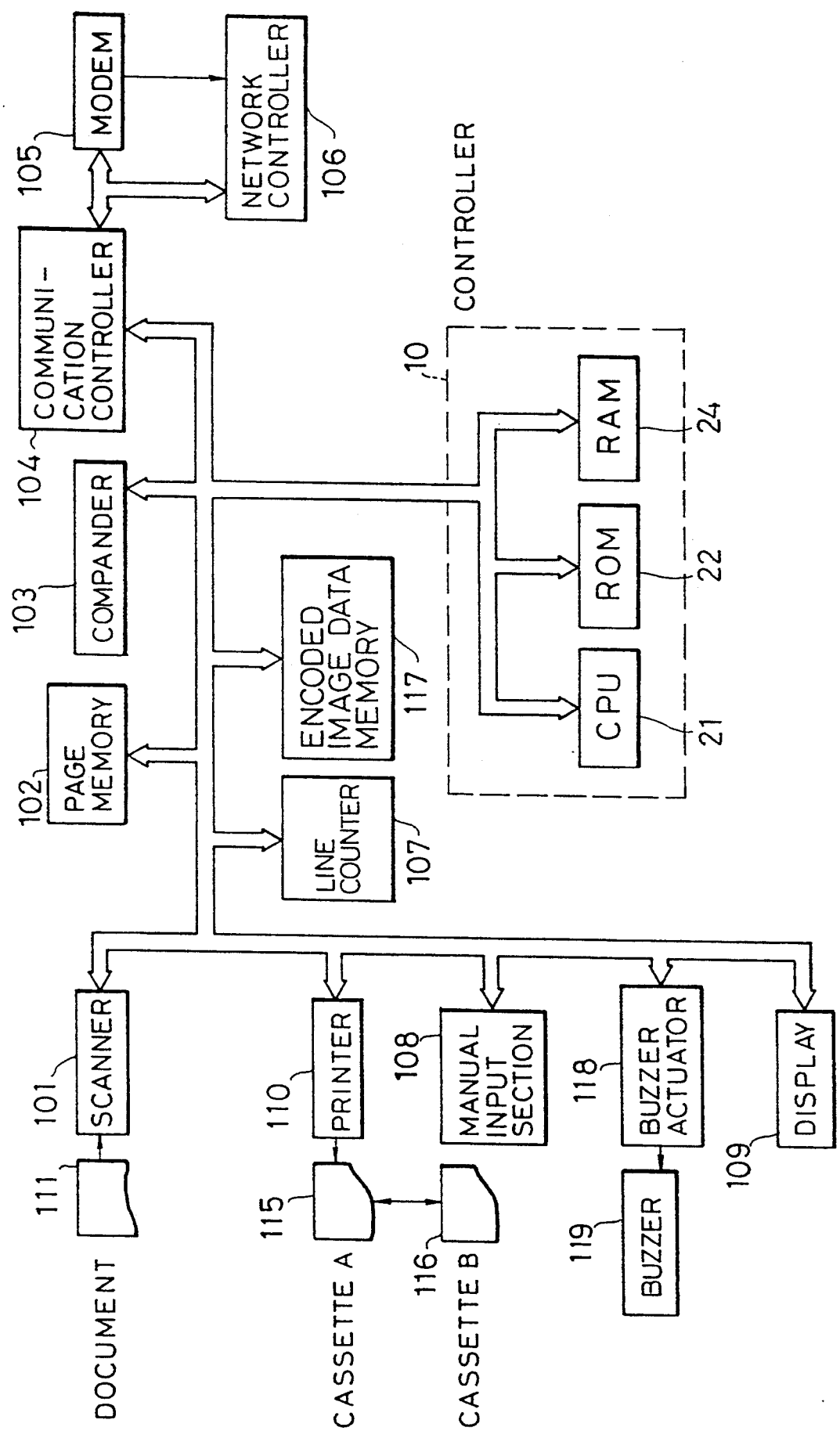
FIG. 1 is a block diagram showing a facsimile machine according to an embodiment of the present invention.

As illustrated in FIG. 1, a facsimile machine of this embodiment comprises a controller 10 which controls the operation of the entire facsimile machine. The controller comprises a central processing unit (CPU) 21, a program, memory in the form of a read-only memory (ROM) 22 storing a program for controlling the operation of the facsimile machine, and a data memory in the form of random-access memory (RAM) 24 for storing data.

The operation performed under control of the program stored in the ROM 22 includes an operation for sending image data to another facsimile machine, and an operation for receiving image data from another facsimile machine. It also includes an operation performed when data of a document page longer than the currently loaded sheets is received, as will be later described in detail.

A scanner 101 optically scans a document 111 and outputs pixel data. The scanner 101 is associated with a document feeder, not shown. A sheet or sheets of paper forming a document are placed on a document feeder section and are extracted one by one and transported to and moved past the scanner. The scanner 101 may comprise a linear image sensor, such as a CCD (charge-coupled device) image sensor, extending in the width direction, i.e., the direction transverse to the direction in which the document sheets are moved past the image sensor. The direction in which the image sensor extends is called the primary scanning direction, while the direction in which the document sheets are moved past the image sensor is called the secondary scanning direction.

As each document sheet is moved past the image sensor, the image sensor optically reads the image on the sheet and produces analog electrical signals having a magnitude corresponding to the brightness or darkness of the respective parts or pixels of the image.

The scanner 101 also includes an A/D converter for converting the analog signals into a series of digital signals, or pixel data. This A/D conversion may be a conversion into black/white signals indicating whether each pixel is black or white. The conversion into the black/white signals is achieved by simply comparing the analog signal with a certain threshold.

When feeding of each sheet is completed, the feeding of the next sheet is commenced. The end of each sheet is detected by a microswitch, which produces an electrical signal, or a page-end information, indicating the end of each sheet.

The scanner 101 is used when image data is to be transmitted from the illustrated facsimile machine to another facsimile machine, not shown.

A page memory 102 temporarily stores the pixel data from the scanner 101.

A compander (compression/expansion circuit) 103 encodes the pixel data frown the page memory 102. That is, the encoding is performed on the series of the pixel data read out of the page memory 102 to produce encoded image data.

A modem 105 performs modulation of encoded image data into suitable form for transmission over the telephone line to another facsimile machine.

A communication controller 104 exercises control related to handshaking signals.

A network controller 106 is for controlling connection and disconnection of the facsimile machine with the telephone line.

The modem 105 also performs demodulation of data transmitted over the telephone line from another facsimile machine.

The compander 103 also performs decoding of image data. The decoding is performed on the encoded image data that is received over the telephone line from another facsimile machine to produce a series of pixel data representing the brightness or darkness of the pixels of the image of the document. The pixel data is identical in form to the pixel data that is produced from the scanner 101.

The page memory 102 stores pixel data obtained by decoding.

An encoded image data memory 117 stores encoded image data as supplied through the communication controller 104.

A line counter 107 counts, for each document page, the number of primary scan lines, i.e., determines the "line count", which represents the length of each page of the document.

A printing section 110 is responsive to the pixel data read out of the page memory 102 and prints the image on cut sheets picked up from a paper cassette 115. The paper cassette 115 is removably mounted to a cassette mounting section, e.g., a cassette slot, provided in the housing of the facsimile machine. Because the paper cassette 115 is removable, exchange with another paper cassette, e.g., 116, containing cut sheets of a different size is possible. For instance, the cut sheets contained in the paper cassette 115 are of a shorter size, e.g., a "letter size", while the cut sheets contained in the paper cassette 116 are of a longer size, e.g., the "legal size". Widths of the letter-size sheets and the legal-size sheets are substantially identical. The invention is however applicable to a situation where cut sheets which are different in width as well as in length are selectively loaded.

A manual input section 108 comprises keys and switches for manual input or manipulation by an operator. The manual input section 108 includes keys for entering the phone number for designating the destination, keys for specifying the mode of operation, and a key for starting a transmission. A feature of the embodiment is that the manual input section 108 also includes a key, named a START key which is used for starting printing of the image data stored in the image data memory 117 after the printing is halted because the length of the document page received is longer than the currently loaded cut sheets. It may be so arranged that the key for starting the transmission also serves as the key for starting the printing after the halt.

A buzzer actuator 118 actuates a buzzer 119, which provides an alarm to the operator or the user of the facsimile machine in the event of the occurrence of a document page longer than the currently-loaded cut sheet.

A display 109 provides the operator with information for indicating the status of the facsimile machine, the mode of operation of the facsimile machine, the phone number that has been entered, and other information for assisting the manipulation of the facsimile machine.

The operation of the facsimile machine for transmitting image data to another facsimile machine connected via the telephone line is as follows:

Sheets of paper forming a document that are placed on the document feeder section extracted one by one are fed to and moved past the scanner 101. As the document sheets are moved past the scanner, the scanner optically scans the image on the sheets to produce pixel data. The pixel data is then temporarily stored in the page memory 102, and is then encoded at the compander 103. The end of each sheet is detected by a microswitch, not shown, which produces the page-end information indicating the end of each sheet.

The encoded image data may then be stored in the encoded image data memory 117 and is thereafter sent via the communication controller 104 and the modem 105, onto the telephone line, under control of the network controller 106. As an alternative, the encoded image data may be passed via the communication controller 104 and the modem 105 onto the telephone line, without first being stored in the image data memory 117.

The data sent out onto the telephone line includes not only the encoded image data, but also the page-end information.

When another facsimile machine sends image data via the telephone line to the illustrated facsimile machine, the image data is also accompanied with page-end information.

The operation of the facsimile machine for receiving such data from another facsimile machine is as follows:

Let us first assume that a paper cassette 115 containing the cut sheets of the shorter length. e.g., the letter size, is initially loaded. The size of the cut sheets currently loaded is known by inspecting a sheet-size identification means on the paper cassette, which may be a notch or projection. The inspection of such an identification mark can be achieved by the use of a sensor, such as a microswitch or a photocoupler. The controller 10 receives an electrical signal from such a sensor, and obtains information indicating the size of the cut sheets being loaded. The controller 10 then obtains information indicating the effective length or the length of the printable part (part over which printing is possible) of the currently-loaded cut sheets.

Figure 2:
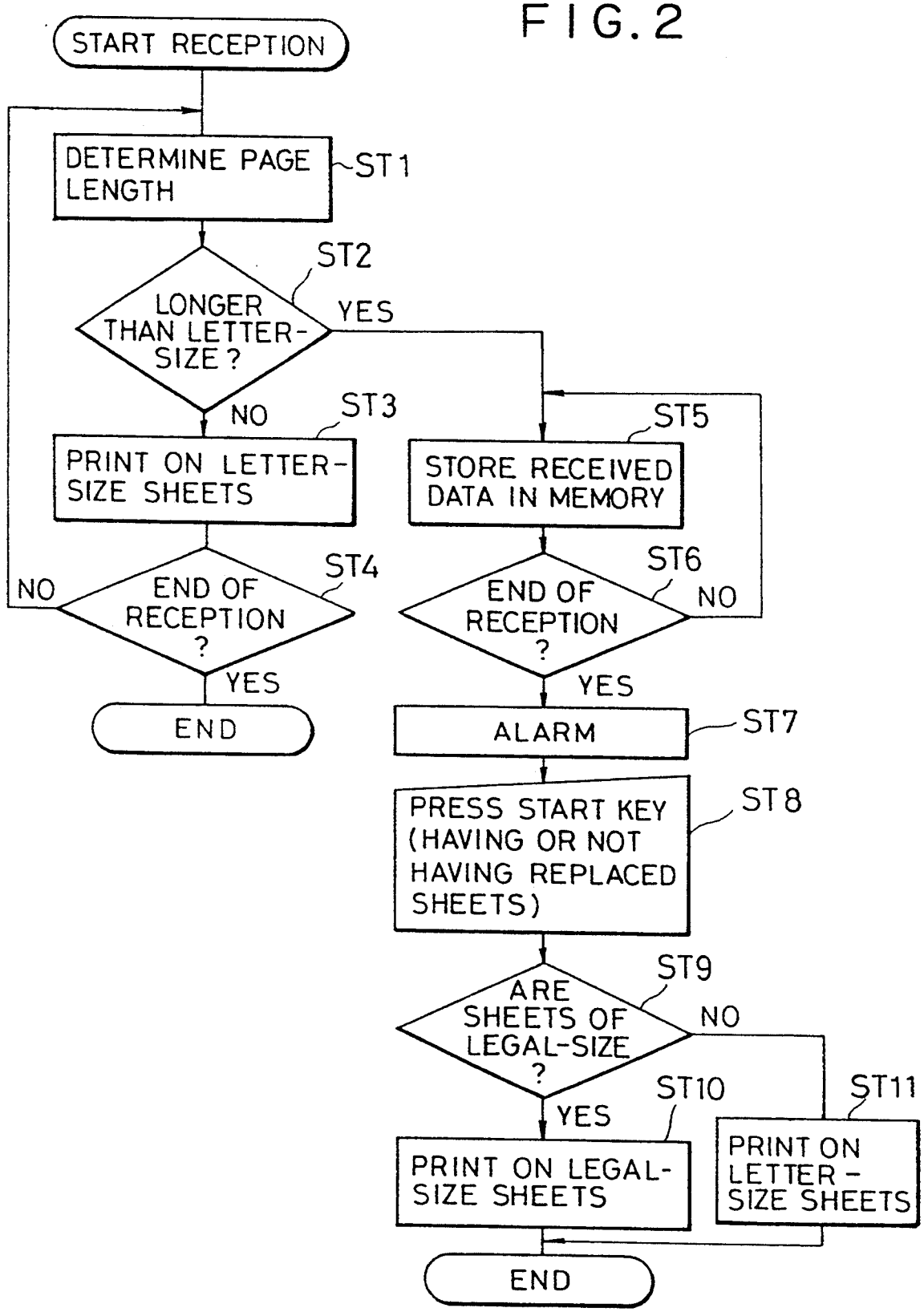
FIG. 2 is a flow chart showing the operation of the facsimile machine shown in FIG. 1.

The operation of the controller 10 of the above facsimile machine at the time of receiving image data is illustrated in FIG. 2.

When there is a call from the telephone line, it is answered automatically by the network controller 106. Then, the communication controller 104, using the network controller 106 and the modem 107, exchanges the requisite handshaking signals with the calling facsimile machine to make itself ready to receive the image data. Thus the reception of the image data is started (ST0).

When image data accompanied with page-end information is received, the image data is demodulated by the modem 104, passed via the communication controller 104, and is stored in the image data memory 117. The image data from the communication controller 104 is also sent to the compander 103 where the image data is decoded. The decoded image data, which are a series of pixel data, are stored in the page memory 102.

The pixel data stored in the page memory 102 are read successively and sent to the printing section 110, which prints the image on the cut sheet having been picked up from the paper cassette 115 and being moved past the printing section 110.

As the image data is decoded, line-end signals indicating the ends of the respective scan lines are also produced. The line end signals are counted by the line counter 107 (ST1). The count value at the end of each document page is taken as representing the effective document page length (length of the part of the document page over which the image extends), and is supplied to the controller 10. The controller 10 then makes judgment as to whether or not the effective document page length is greater than the effective length of the cut sheet contained in the currently loaded paper cassette 115 (ST2). Although what really matters are the effective document page length and the effective length of the cut sheet, these are sometimes referred simply as the document page length and the effective length of the cut sheet, where confusion is unlikely to occur.

When it is found that the document page is not longer than the currently-loaded sheets, the printing of that document page is commenced (ST3). As the printing proceeds, the pixel data that have been printed are erased from the page memory 102. As the printing of each document page is completed, the encoded image data of that document page is erased from the image data memory 117.

Cut sheets are fed to the printing section one by one, and data is sent to the printing section 110 in time with the supply of the cut sheet. The image data is printed on the sheet. The end of data for each document page is known from the page-end information. When printing of the data for one document page is completed the sheet is ejected out of the printing section, and a next sheet is fed to the printing section 110, and the data for the next document page is printed on the next sheet. In this way, the data for a plurality of document pages are printed on the respective sheets. In other words, the above steps ST1 to ST3 are repeated until image data for all the document pages are received and their image are printed (ST4).

When the document page is found to be longer than the currently-loaded cut sheet (ST2), the controller 10 inhibits the commencement of the printing of the particular document page, and enters the memory reception mode of operation (ST5). In the memory reception mode, the decoding at the compander 103, the line counting at the liner counter 107, the storage in the page memory 102 and the printing by the printing section 110 are halted, while the demodulated encoded image data for any subsequent pages are kept written into and accumulated in the image data memory 117.

When reception of all the document pages in the memory reception mode has been completed (ST6), the controller 110 causes the buzzer actuator 118 to actuate or sound the buzzer 119 (ST7). The sounding of the buzzer 119 is an indication to the operator of the facsimile machine that the document page is longer than the currently-loaded sheet, prompting replacement of the paper cassette 115 with one 116 containing longer sheets. In addition to the sounding of the buzzer 119, the controller 110 causes the display 109 to give a message (prompt) to the operator that the document page length exceeds the length of the currently-loaded cut sheet, and cut sheets of a longer size should be substituted. Responsive to the sounding of the buzzer 119 and the message on the display 109, the operator may replace the paper cassette 115 containing the letter-size cut sheets with another paper cassette 116 containing legal-size cut sheets. The controller 110 can confirm the replacement by inspecting the sheet-size identification mark on the paper cassette 116, and causes the display 109 to give a message to the operator that the START key should be pressed to restart the printing on the substituted sheets. When the operator presses the START key (ST8), the printing on the currently loaded sheets is re-started (ST10 or ST11). Before the re-start of the printing, the size of the cut sheets is checked. If the legal-size cut sheets have been substituted, the printing is made without division of image of one document page into two cut sheets.

If the START key is pressed with the letter-size cut sheets loaded (having once been removed and thereafter inserted, or having not been removed), the printing is made with the image of the longer document page being divided into two cut sheets. In dividing the image of one document page into two cut sheets, part of the image that can be accommodated in the first cut sheet is printed on the first page, and the remaining part of the image (part that has overflowed the first cut sheet) is printed on the second cut sheet.

The printing is re-started even if the operator has not replaced the paper cassette. This happens when the operator chooses to print the image on the letter-size cut sheets, because for instance the legal-size cut sheets are not available.

The printing initiated by the pressing of the START key is effected by transferring the encoded image data from the image data memory 117 to the data compander 103, which converts the encoded image data into the decoded image data or pixel data. The pixel data is transferred to the page memory 102, and is then successively supplied to the printing section 110, where the image is printed.

Figure 3:
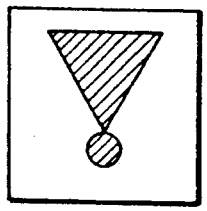
FIG. 3 is an explanatory drawing showing the relationship between received document pages and printed pages using the facsimile machine shown in FIG. 1.
Figure 3:
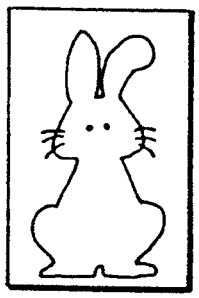
Figure 3:
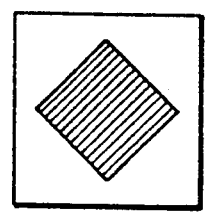
Figure 3:
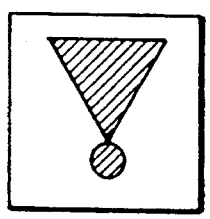
Figure 3:
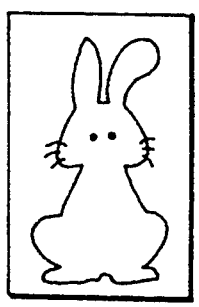
Figure 3:
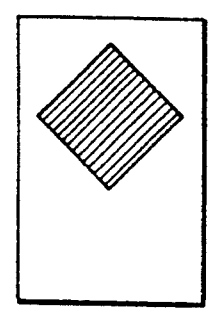
Figure 4:
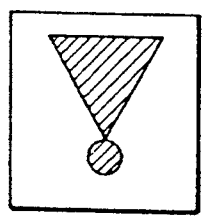
FIG. 4 is an explanatory drawing showing the relationship between received document pages and printed pages using a prior-art facsimile machine.
Figure 4:
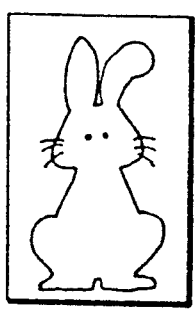
Figure 4:
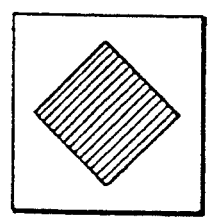
Figure 4:
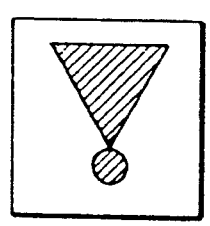
Figure 4:
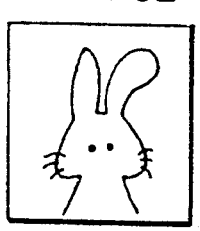
Figure 4:
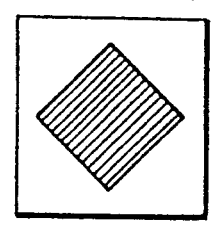
Figure 4:
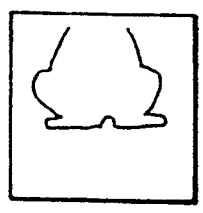

As an example, let us assume that the first page of the document is of a letter size and the second page is of a legal size, and the third page is of a letter size as shown in the upper half of FIG. 3, and the letter-size cut sheets are initially loaded.

The image data of the first page is received and printed on the first letter-size cut sheet, with the page length being found not to exceed the letter-size cut sheet. When the printing of the first page is completed, the image data for the first page is not retained in the page memory 102 nor in the image data memory 117. When the image data of the second page is received, and decoded by the compander 103, its page length is found to exceed the letter-size cut sheet and the printing is halted, the image data of the second page and the third page are retained in the image data memory 117. The image data of the second page may also be retained in the page memory 102.

Upon completion of the reception of all the pages, the buzzer 119 is sounded and the display 109 gives the message. When the paper cassette 115 is replaced with the paper cassettes 116 containing the legal-size cut sheets, and the START key is pressed, the printing is resumed. This time, the image data is supplied from the image data memory 117, decoded at the compander 103 into the pixel data, which are temporarily stored in the page memory 102, and are successively supplied to the printing section 101, where the image of the second and third pages are successively printed on the legal-size cut sheets.

The legal-size cut sheet used for printing the third document page is longer than the third document page, but this presents little problem. Although it is technically possible to produce another alarm and/or message prompting replacement of the legal-size cut sheets with the letter-size cut sheets, this measure is not adopted, and the printing of the image of each document page is continued as long as the document page is not longer than the currently loaded cut sheet, for the sake of simplicity of control and of reducing the trouble on the part of the operator.

In this way, the image of all the document pages are printed on the cut sheets without division. This is in contrast to the prior art facsimile machine, with which in a similar situation, the image of the second document page is divided into two cut sheets (2nd and 3rd pages) as illustrated in the lower half of FIG. 4.

In the above embodiment, the document feeder feeds the document sheets one by one. The scanner 101 may not be associated with this type of document feeder and may be provided with a glass window, called a copyboard, on which the document is placed face-down, and the scanner rather than the document may be moved past the document.

In the above embodiment, the facsimile machine has a single cassette slot for accommodating a single paper cassette, and cut sheets of a single size can be loaded at a time. The invention is applicable where the facsimile machine has a plurality of cassette slots respectively accommodating paper cassettes containing cut sheets of respectively different sizes and the cuts sheets are automatically selected according to the size of the document page as detected by the line counter 107 and the controller 10. For example, a cassette containing letter-size sheets and a cassette containing legal-size sheets may be loaded. In such a situation, the same effects can be achieved when the legal-size cut sheets have been exhausted.

Moreover, in the above embodiment, a dedicated buzzer is used for providing the alarm for the excessive length of the document page, but a buzzer used for other purposes may also be used for the alarm of the excessive document page length. For instance, a buzzer that is generally provided to notify the completion of the communication may be used also for the alarm of the excessive document page length. Alternatively, it is also possible to eliminate the buzzer and give the alarm only by means of the display 109, or by a light-emitting element, such as a light-emitting diode.

In the above embodiment, the image data memory 117 stores all the document pages starting with the document page which has been found longer than the currently loaded cut sheets. However, it may be so arranged that the document page having been found to exceed the currently loaded page is stored in the page memory 102 and not in the image data memory 117, and the subsequent pages are stored in the image data memory 117. In adopting this arrangement, the number of pages that can be stored in the facsimile machine is increased by one. Where such modification is adopted, it is convenient if the data in the image data memory 117 is erased when the storage of the same page in the page memory 102 is completed.

In the above embodiment, the facsimile machines are connected to each other by telephone lines. The invention is applicable where the facsimile machines are connected by any other communication lines.

As above described, the present invention provides a facsimile machine which is so configured that when the document being received contains a page that is longer than the currently-loaded cut sheet, image data of the particular page and any subsequent pages are stored in a memory means and an alarm is issued, thereby realizing the effect of preventing the printing of a single received page on separate sheets.

What is claimed is:

1. A facsimile machine, comprising:
   means for receiving image data transmitted over a communication medium, said image data being arranged by page and containing page-end information indicating the end of a page;
   means for holding cut sheets of recording paper of any one of a plurality of predetermined sizes;
   means for printing an image represented by said received image data on said cut sheets of recording paper held in said holding means;
   image memory means for storing said received image data;
   page length determining means for determining the length of a page of said received image data in conjunction with said page-end information;
   alarm means for providing an alarm indication to an operator of said facsimile machine; and
   control means for causing received image data having at least one determined page length longer than said cut sheets of recording paper held by said holding means to be accumulated in said image memory means, actuating said alarm means to alert said operator to the fact that image data has been received having a page length longer than said held sheets of recording paper, and halting printing of said image by said printing means until further action has been taken by said operator.

2. A facsimile according to claim 1, wherein each page of said image data is comprised of a number of scan lines, and said page length determining means comprises a line counter for counting the number of scan lines in each page of said received image data.

3. A facsimile machine according to claim 2, wherein the length of a page is determined by said page length determining means in terms of a counted number of scan lines.

4. A facsimile machine according to claim 1, wherein said image data is produced by scanning a document with a scanner, and said length of a page corresponds to the dimension in the direction of said scan.

5. A facsimile machine according to claim 4, wherein said scanning is performed by passing said document over a stationary scanner.

6. A facsimile machine according to claim 4, wherein said scanning is performed by passing said scanner over a stationary document.

7. A facsimile machine according to claim 1, further comprising a plurality of paper cassettes each for containing said cut sheets of recording paper of a particular size, and said means for holding comprises a cassette loading section into which said paper cassettes are interchangeably loaded.

8. A facsimile machine according to claim 1, wherein:
said image data received over said communication medium is encoded, said facsimile machine further comprising means for decoding said received image data;
said printing means receiving decoded image data; and
said image memory means comprising a first memory for storing received encoded image data.

9. A facsimile machine according to claim 8, wherein:
said image memory means further comprises a second memory for storing at least one page of decoded image data;
said printing means receiving said decoded image data from said second memory; and
said control means causes stored image data in said first memory that corresponds to an image that has been printed on a cut sheet to be erased.

10. A facsimile machine according to claim 9, wherein said control means further causes stored image data in said second memory to be erased as an image corresponding to that data is being printed by said printing means.

11. A facsimile machine according to claim 7, wherein said control means causes said received image data having at least one determined page length longer than said cut sheets of recording paper held by said holding means to be printed upon exchange of a cassette containing said held cut sheets of paper with a cassette containing cut sheets of paper of a longer size.

12. A facsimile machine according to claim 1, wherein said control means causes said received image data having at least one determined page length longer than said cut sheets of recording paper held by said holding means to be printed upon pressing of a start key of said facsimile machine by said operator.

* * * * *